H. W. SMITH.
LOOM.
APPLICATION FILED MAY 10, 1905.
1,107,553.
Patented Aug. 18, 1914.
6 SHEETS—SHEET 6.
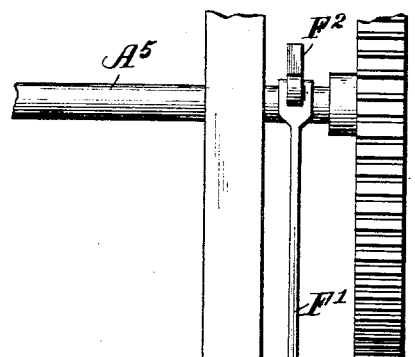
Fig. 8.
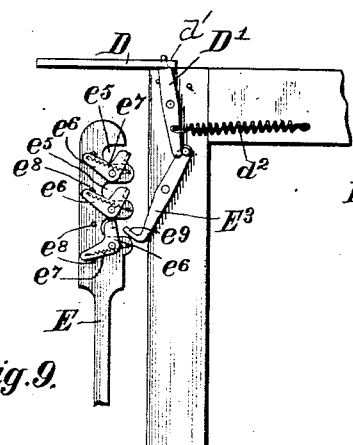
Fig. 9.
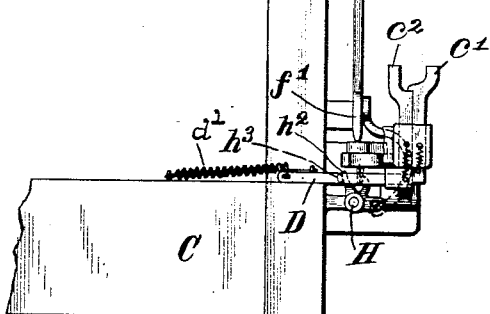
Fig. 10.
Fig. 11.
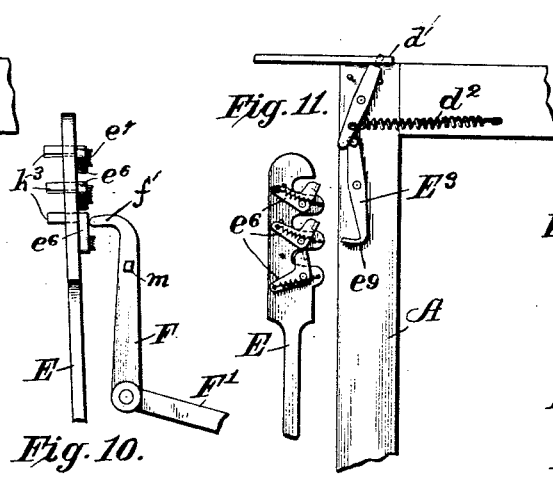
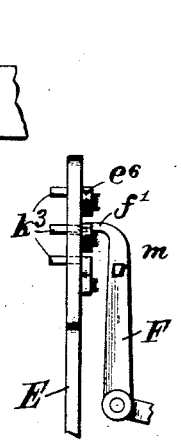
Fig. 12.
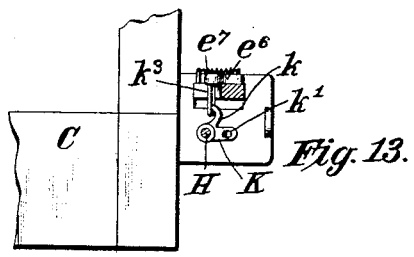
Fig. 13.
Witnesses:
A. R. Hunter
H. S. Babcock
Inventor:
Harry W. Smith
by Robt. P. Harris.
Attorney

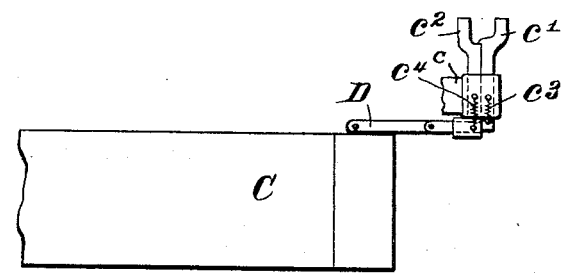
Fig. 5.
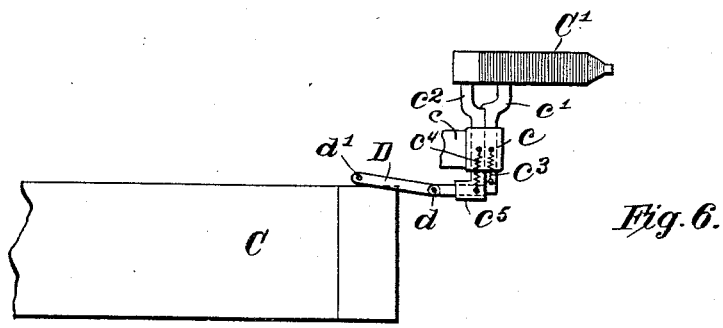
Fig. 6.
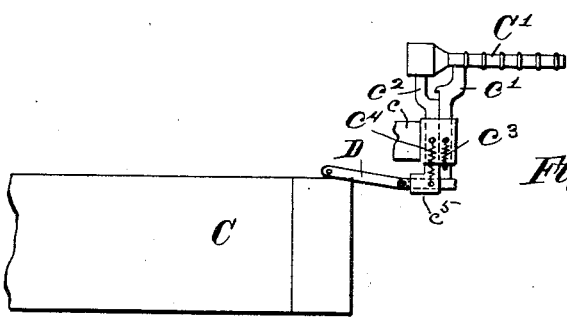
Fig. 7.

UNITED STATES PATENT OFFICE.

HARRY WITTER SMITH, OF NORTH GRAFTON, MASSACHUSETTS, ASSIGNOR TO CROMPTON & KNOWLES LOOM WORKS, A CORPORATION OF MASSACHUSETTS.

LOOM.

1,107,553.   Specification of Letters Patent.   Patented Aug. 18, 1914.

Application filed May 10, 1905. Serial No. 259,690.

*To all whom it may concern:*

Be it known that I, HARRY W. SMITH, a citizen of the United States, residing at North Grafton, in the county of Worcester and State of Massachusetts, have invented certain new and useful Improvements in Looms, of which the following is a specification.

The invention to be hereinafter described relates to looms of that general type wherein a series of movable shuttle boxes are employed in connection with filling replenishing mechanism. In such type of loom, it is an essential that, upon failure of the filling from any cause that the loom be stopped or that upon its approach to complete exhaustion in an active shuttle, that the filling replenishing mechanism be made operative to effect a fresh supply of filling. Should the boxes change, however, after an indication for replenishing the filling, it is obvious that the indicating shuttle will not be returned to the changing side of the loom at once, in which case the operation of the mechanism for effecting the change of filling must be suspended until the depleted shuttle again returns to the filling changing side of the loom. The accomplishment of these objects in proper manner results in increased production of cloth. On the other hand, should a warp thread break, the loom will still continue to weave cloth and incorporate the broken end into the product, until its discovery enables the attendant to stop the loom and piece up. This becomes of great practical objection, particularly in the gingham loom, where perfection of product and cheapness of manufacture are indispensable.

Generally stated, then, one of the objects of the present invention is to provide a loom of the general type referred to with means whereby different colors or characters of filling may be employed in connection with filling changing and warp stop mechanism, so that not only will perfection of product result, but one operative can tend an increased number of looms, without danger of defective production, thus insuring a perfect fabric at minimum initial cost in labor.

With these generally stated objects in view, the invention consists of the parts and combinations to be hereinafter described and definitely pointed out in the claims.

Figure 1:
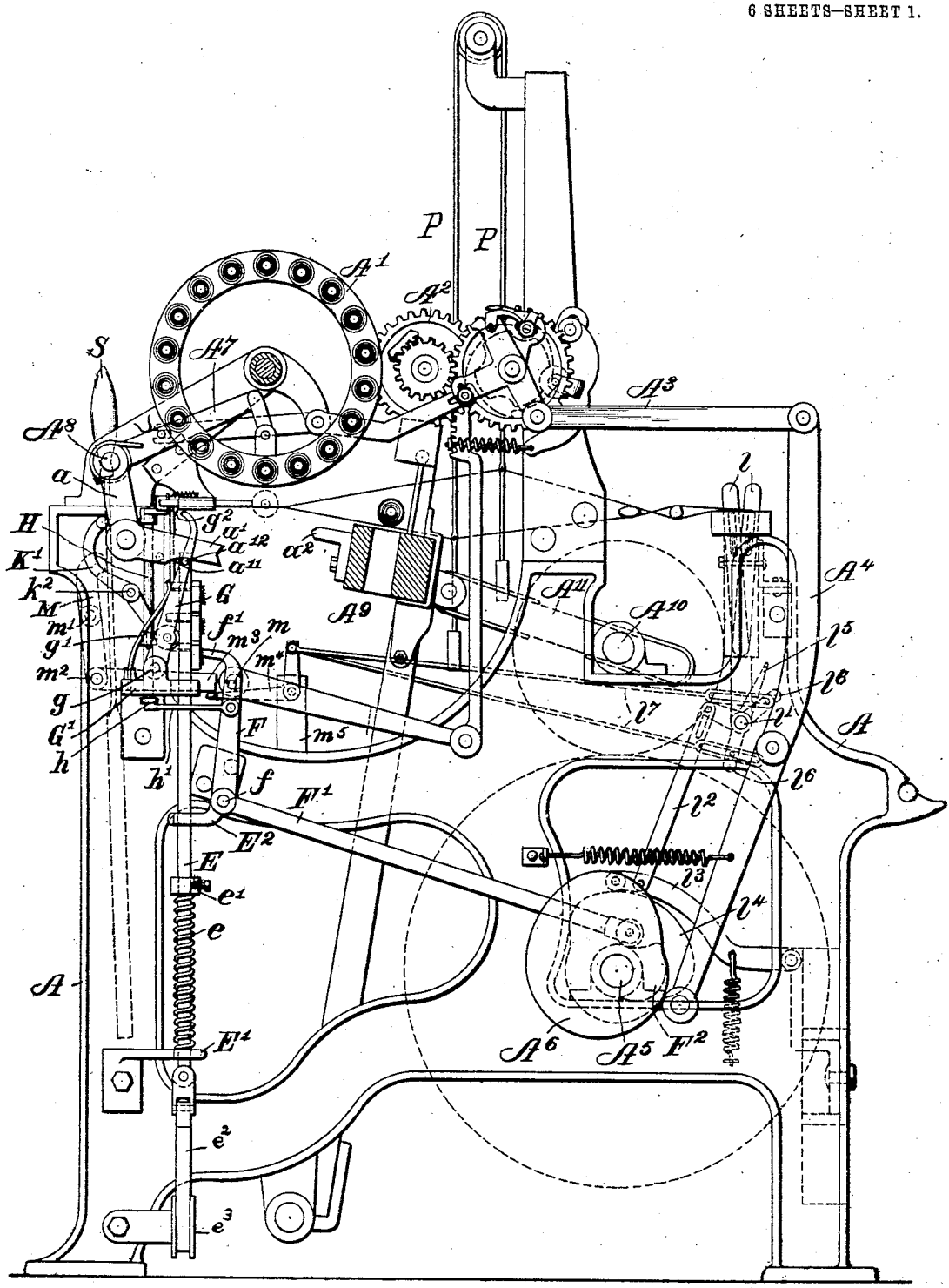
Figure 2:
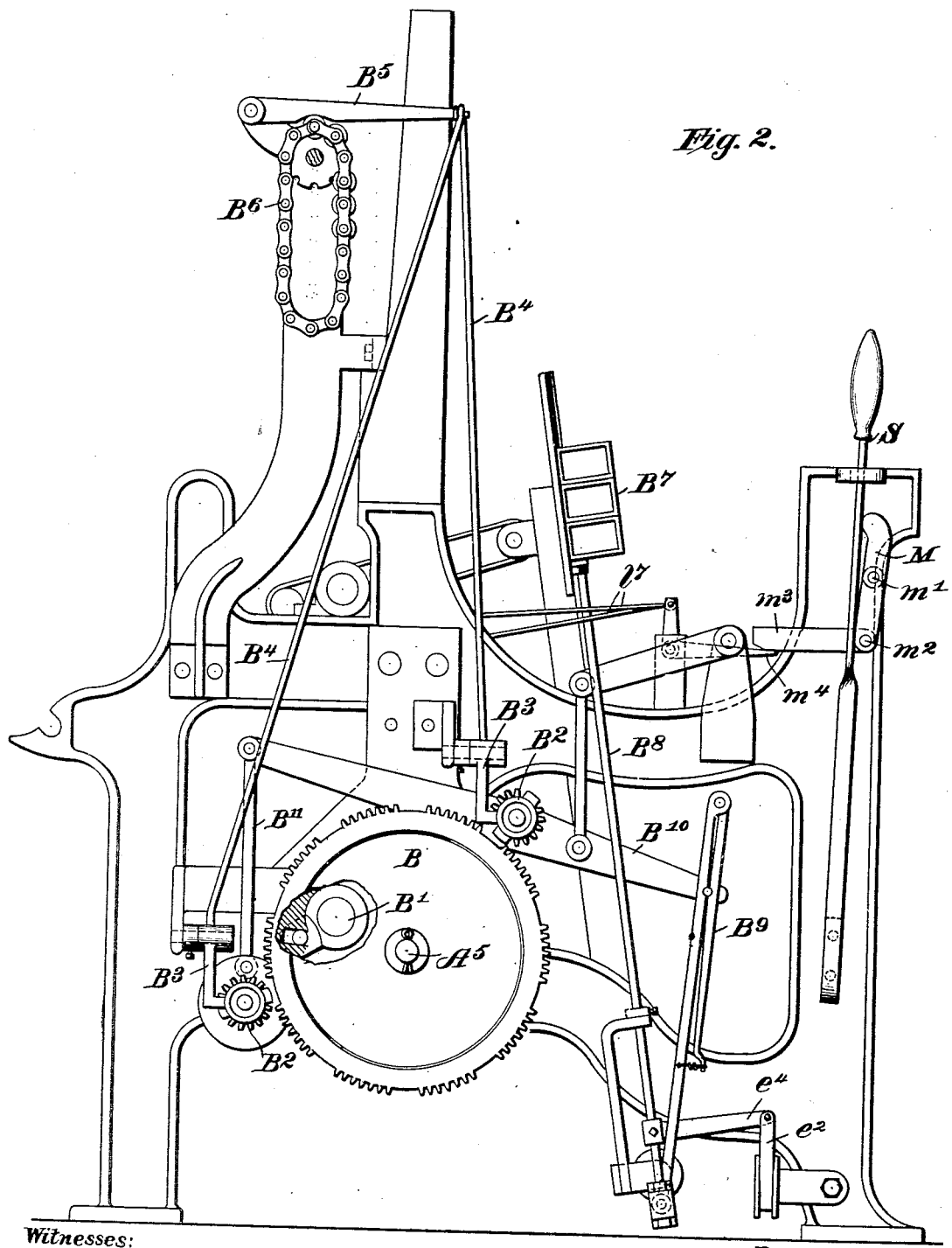
Figure 3:
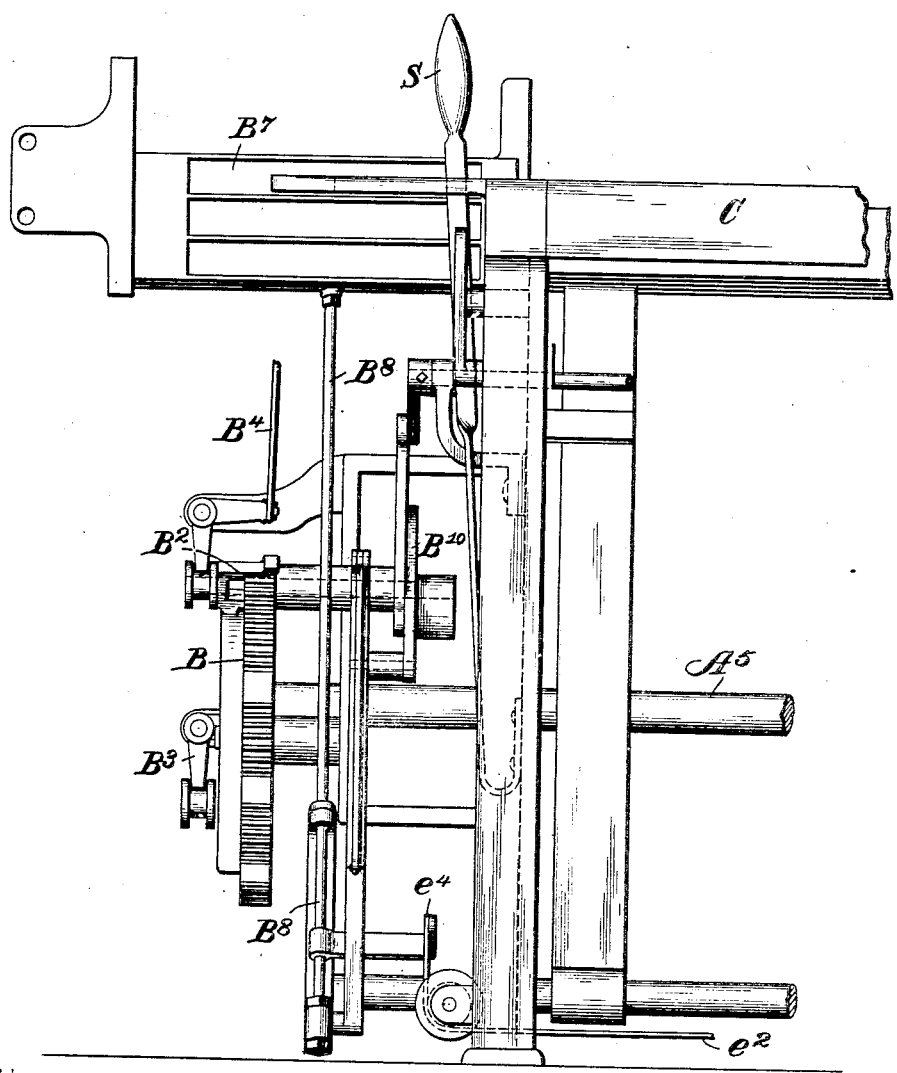
Figure 4:
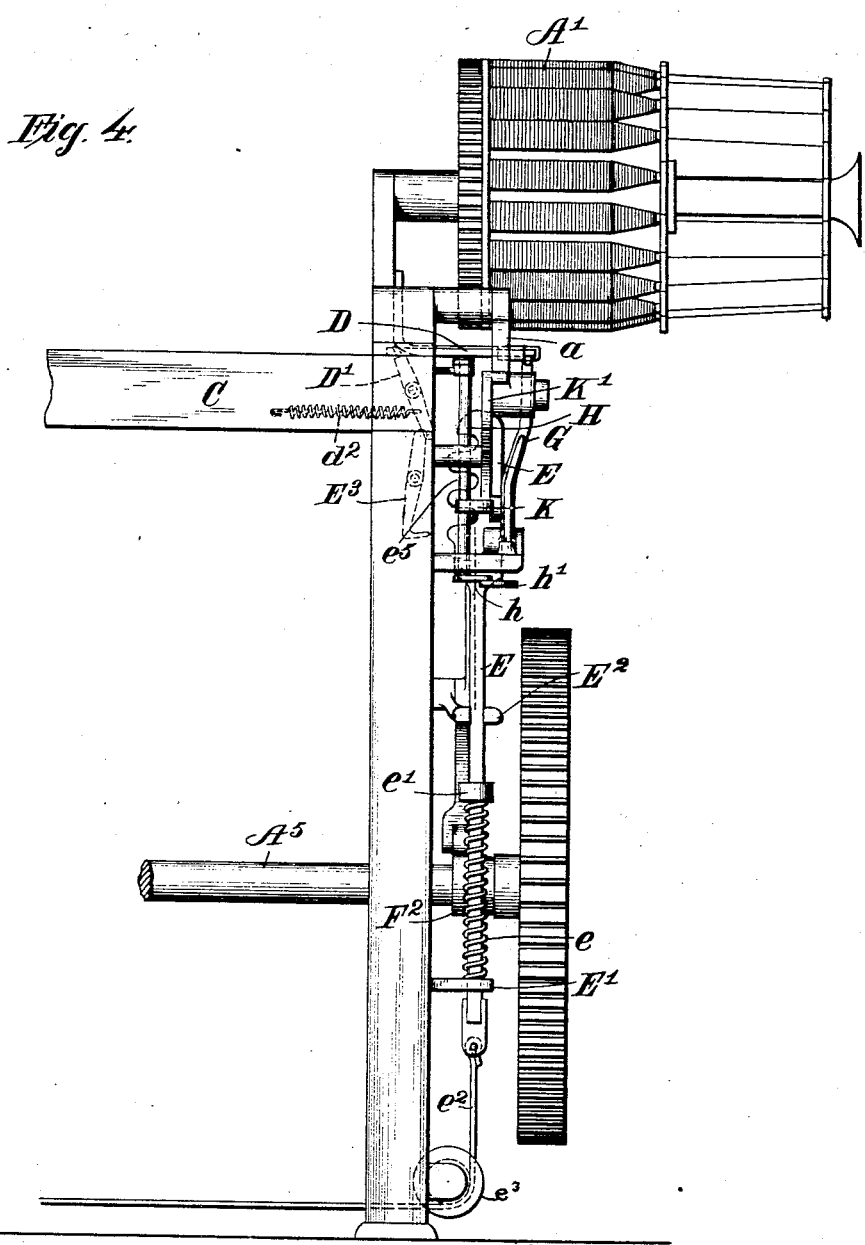

In the drawings: Figure 1 represents a loom in side elevation embodying the present invention. Fig. 2 is a side elevation of the same at the side opposite that in Fig. 1, some of the parts being broken away. Fig. 3 is a front elevation of the movable shuttle box side of the loom. Fig. 4 is a front elevation of the side of the loom opposite to Fig. 3, showing the general form of one character of filling replenishing mechanism that may be employed. Fig. 5 is a diagrammatic plan view showing the relation of detectors and filling carrier when the lay is in its back position or away from the front of the loom. Fig. 6 is a similar view to Fig. 5, showing the relation of filling carrier and detectors when the lay is in its forward position, the detectors being represented as acting on a full carrier. Fig. 7 is a view similar to Fig. 6 with the exception that the detectors are represented as acting on a practically exhausted filling carrier. Fig. 8 is a detail plan view of the detectors and their connected parts, and the vibrating feeler, and its actuating means. Fig. 9 is a detail side view showing the upper portion of the indicator and its adjunctive parts. Fig. 10 is an edge view of the same, showing the relation of the feeler with respect thereto. Figs. 11 and 12 are views similar to Figs. 9 and 10, respectively showing the parts in different position. Fig. 13, is a detail plan and part sectional view showing the indicator and its resetting mechanism.

In the accompanying drawings, I have shown, as one embodiment of my present invention, a form of filling or replenishing mechanism which shall be rendered operative to effect a further supply of filling when that in the shuttle approaches, but prior to, complete exhaustion, and while I have described this particular form of filling changing or replenishing mechanism, yet I desire it to be understood that my invention is not limited in this respect, and the objects of the present invention would be attained by other forms of such mechanism, as, for instance, where the filling is replenished by changing the shuttle.

In the illustrated form of the invention, the loom frame A, the hopper A′ carrying the series of bobbins arranged in groups corresponding to the characters of filling to be employed, the machanism $A^2$ and its adjunctive parts for operating the hopper A' to maintain the proper character of filling in position to be placed in its corresponding shuttle, the lever A⁴, link A³, bottom shaft A⁵, its cam A⁶, the filling changing arm A⁷, the shaft A⁸, the lay A⁹, crank shaft A¹⁰, connecting rods A¹¹, all may be in the usual form, as indicated in Patent 600,053, to which references may be had, and said parts being fully and completely described in said patent, further description herein becomes unnecessary, except in so far as the parts enumerated may be modified or changed by the other combined parts, as will hereinafter appear.

In the present embodiment of my invention, also, I have selected a shuttle box of the shifting type, as also illustrated and fully described in Patent 600,053, hereinbefore referred to. It is to be understood, of course, that the character of the shuttle box mechanism forms, as to its details, no essential part of my present invention, as the shuttle boxes themselves may be of the usual type, as shown in the drawings, or any other usual forms of movable shuttle boxes. The master gear B, its operating means B', shifting tooth gears B² and the means B³, B⁴, B⁵ and B⁶ for operating the sliding teeth in said gears, the shuttle boxes B⁷, shuttle box rod B⁸, and the intermediate connections B⁹, B¹⁰ and B¹¹ between the shuttle boxes and their controlling mechanism may be substantially as shown in Patent No. 600,053, which, being fully described therein with respect to their disposition and operation, need no further elaboration.

The essentials as to the two groups of mechanisms hereinbefore referred to, as typified in one form by the Patent 600,053, are that there shall be provided a hopper with suitable filling supply carriers arranged in groups corresponding to the number of boxes or characters of filling being employed, that the said hopper shall be maintained in operative relation with the active shuttle so as to provide the proper filling therein when made operative; and that the shuttle box operating devices shall present the required box under the call of the pattern desired to the level of the race, a convenient form of such mechanisms being shown in the patent referred to, I have simply called attention to said patent as embodying one of the general characters of such mechanisms that may be embraced as parts of the combinations and inventions hereinafter to be claimed.

Projecting downward from the shaft A⁸ is the arm $a$ carrying at its lower end the actuating arm $a'$. In normal position, the actuating arm $a'$ rests, as shown in Fig. 1, with its end normally below the path of the movement of the bunter $a^2$ secured to the lay A⁹, and, when under the call of a depleted or nearly depleted filling carrier, the actuating arm $a'$ is raised, in a manner to be hereinafter described, the bunter $a^2$ will strike the end of the actuating arm $a'$ and thereby operate the filling changing instrumentalities as will be hereinafter described.

Upon reference to Figs. 3 and 4, it will be seen that the movable shuttle boxes are disposed at one side of the loom and that the filling replenishing mechanism is disposed at the opposite side of the loom. In my present invention, I have also shown the detector, which feels for the filling on the carrier, as hereinbefore explained, also disposed at the filling replenishing side of the loom.

Referring more particularly to Figs. 5, 6 and 7, C denotes the breast beam of the loom having a bracket $c$ properly connected therewith. From the bracket $c$ project the two detectors $c'$, $c^2$, normally forced in one direction by means of the springs $c^3$, $c^4$, so that, upon the beating up movement of the lay, the filling carrier C' may be brought against the ends of the detectors $c'$, $c^2$, indicated in Fig. 6. One of the detectors, as $c^2$, has its end, $c^5$, which is farthest removed from the lay, provided with a transverse opening or guide through which extends and moves the end of a detector slide D. This detector slide D, as indicated in Figs. 5, 6 and 7, may preferably be formed of two parts jointed at $d$. The end $d'$ of the detector slide D is connected to the upper extremity of a spring actuated lever D', see Figs. 9 and 11, the spring $d^2$ being connected near the lower end of said lever to normally throw the detector slide to the right. (See Figs. 5, 6 and 7.) In normal working condition of the loom, as shown in Figs. 5 and 6, with respect to the detectors, the end of the detector slide D, after it has passed through the guide $c^5$, abuts against the end of the detector $c'$, so that the detector slide is prevented from moving to the right in Figs. 5, and 6. This relation of the detector slide and the detectors will be maintained as long as there is sufficient supply of filling on the carrier to insure the proper production of perfect cloth, and as the lay beats up, the detectors $c'$ and $c^2$ contact, the one with the base of the carrier and the other with the filling thereon and both will be moved toward the front of the loom, as indicated in Fig. 6. The end of the detector $c'$ still holding the end of the detector slide D from moving to the right. As the filling becomes more and more exhausted on the carrier, such movement of detector slide $c'$ will become less and less, until, when the filling has become so far exhausted that only sufficient remains for a few more picks, the end of the detector $c'$ will uncover the end of the detector slide, see Fig. 7, and permit the detector slide D to move under the impulse of its actuating spring $d^2$, thus indicating a practical depletion of the filling on the carrier in use.

Mounted at the single box side of the loom and adjacent the filling changing mechanism is the upright E passing through brackets $E'$, $E^2$, being normally forced upward by a spring $e$ disposed between the collar $e'$ and the lower bracket $E'$. Connected with the upright E, which, with its connected parts, I will, for identification, denominate the indicator, is a strap $e^2$ which passes about a pulley $e^3$ at the lower part of the loom and extends to the opposite side thereof, where it is connected, see Fig. 3, at $e^4$, to the shuttle box rod, so that, as the shuttle boxes rise and fall under the call of the pattern, the indicator or upright E will move in conformity therewith. At the upper end of the upright E are a series of notches $e^5$, formed in the edge thereof and corresponding in number to the number of shuttle boxes at the opposite side of the loom. Pivotally mounted on the upright E adjacent each of the openings $e^5$ is a stop $e^6$, preferably as a bell crank lever and acted on by a spring $e^7$, so that, should the stop $e^6$ be moved upon its pivot into its active or inactive position, as shown in Fig. 9, the spring $e^7$ will maintain the stop in such position by reason of its action on one or the other side of the lever connection, as will be obvious. Suitable pins $e^8$ may be provided to limit the extent of movement of said stops.

Pivoted to the loom side, see Figs. 9 and 11, is an indicator trip $E^3$, the upper end of which is provided with a pin to contact with and connected with the lower end of the lever $D'$, and its opposite end has a finger $e^9$, which, when the indicator trip is moved into the position shown in Fig. 9, by movement of the detector slide, will contact with one of the indicator stops $e^6$ which happens to be opposite the same and move it upon its pivotal connection with the upright E.

Pivoted to the bracket $E^2$, as shown in Fig. 1, at $f$, is a feeler F having connected thereto an actuating arm $F'$, the end of which rests upon a cam $F^2$ secured to the bottom shaft $A^5$ so that said feeler F is movable upon its pivot $f$ and the upper end $f'$ is disposed adjacent the openings $e^5$ of the upright or indicator E, so that should an indicator stop $e^6$ not be in the path of the end $f'$ of the feeler, the end $f'$ will pass into the opening $e^5$ of the indicator. Should, however, an indicator stop, such as the lower one in Fig. 9, have been moved to close the opening in the indicator E, then the end $f'$ of the feeler F would strike such indicator stop and cause the indicator E to be moved in conformity with the movement of the feeler. The brackets $E'$ $E^2$ are properly slotted to permit such movement of the indicator E. The actuating arm $a'$ has a curved under surface $a^{11}$, which rests upon a pin $a^{12}$ secured to a lever G which is itself pivoted at $g$ to the stand $G'$ and is normally pressed to the right in Fig. 1 by a spring $g'$, whereby said lever G is held against the indicator E. It thus follows that, upon movement of the indicator E to the left in Fig. 1, the lever G will likewise be moved and thereby raise the actuating arm $a'$ into the path of the bunter $a^2$ with the result that the filling changing mechanism will be operated through the arms $a$ and $A^7$, as in Patent 600,053, hereinbefore referred to.

Since the indication for practical exhaustion of the filling takes place at the filling changing side of the loom, the detector slide D will move the indicator stop corresponding to the shuttle in play at a time when the end $f'$ of the feeler F is feeling into the opening $e^5$ but the indicator stop will be held in position by its spring $e^8$ to move across the opening upon the subsequent withdrawal of the end of the feeler. Should the shuttle boxes not be changed upon the return of the indicating shuttle to the drop box side of the loom the same practically exhausted carrier will be again returned to the single box and indicating side of the loom, whereupon the change of filling will take place as hereinbefore pointed out. Should, however, the shuttle boxes change upon the return of the practically depleted shuttle to the drop box side of the loom, the indicator E will likewise be moved in conformity with the shuttle box movement and upon the next pick no change of filling will occur, as will be obvious, the indicator stop having been moved from its position of contact with the end $f'$ of the feeler. Upon the subsequent return of the practically depleted shuttle to the single box side of the loom, a change of filling will take place, as already indicated.

In order to properly effect the change of filling, it is essential that the detectors $c'$ $c^2$ be moved from their detecting position at the moment of change of filling so that they would not interfere with the operation, and to this end, such detectors are provided with a projection $g^2$ on the other side thereof with which engages the upper end of the lever G as it moves under the call of the indicator E, thus withdrawing the detectors from their position within the shuttle.

When the detector slide D has detected the practical exhaustion of the filling and been moved as hereinbefore described, it is essential that it be returned to its detecting position, that is, in the position indicated in Figs. 5 and 6, so that it may again be in operative condition to effect a further indication. Mounted in suitable brackets in the loom side is an upright shaft H, Figs. 1, 8 and 13, the lower end of which is provided with a crank and pin connection $h$ with a link $h'$ secured, as shown in Fig. 1, to the feeler F, so that upon movement of the feeler the said shaft H will be oscillated about its longitudinal axis. At its upper end the shaft H is provided with a finger $h^2$ adapted to engage a projection $h^3$ on the other side of the detector slide so that, upon reciprocating movement of the upright shaft H, the finger $h^2$, if it finds the detector slide in its position to the right, Fig. 8, will return the detector slide to the left against the tension of its actuating spring $d^2$ and permit the detector $c^2$ to move forward and carry the end of the detector slide into position with its end resting against the detector $c'$, thus securing a return to its normal operative position for ready indication. The parts being operated to effect a change of filling, it becomes necessary that the indicator stop, which has affected this operation through the instrumentalities already described, shall be returned to its normal position of non-indication, to do which, there is loosely mounted upon the upright shaft H, see Fig. 13, a sleeve K having a finger $k$ and an arm $k'$. Likewise pivoted, see Fig. 1, to the loom frame adjacent the upright shaft H, is a setting lever K', pivoted at $k$ and having its lower end extended into and engaging the slot or opening $k'$ of the loose sleeve K. The upper end of the setting lever K', see Fig. 1, bears against the rear side of the arm $a$ of the filling changing mechanism, so that, upon operation of the filling changing mechanism, the setting lever K will be moved upon its pivot $k^2$. Each of the indicator stops $e^6$, see Fig. 13, is provided with the setting finger $k^3$, which is adapted to be engaged by the finger $k$ of the setting lever K when the same is moved as described, whereby upon operation of the filling changing mechanism, the setting lever acts to throw the indicator stop back to its normal position ready for another indication.

A loom constructed in accordance with the instrumentalities thus far described will operate to effect a change of filling when that in an active shuttle becomes practically exhausted and prior to complete exhaustion, and it will likewise operate in this manner with a plurality of shuttles, and while I have shown and described special mechanism for accomplishing these results with the ultimate object of securing a perfect product, it is to be understood that I do not regard my invention as limited to the details of structure in these respects. Thus, any usual form of filling changing mechanism may be employed, either to change the filling in the shuttle or to change the shuttle itself, and likewise, various devices for indicating the change and determining the period of the operation of such filling changing mechanism might be employed. In the operation of such a loom, however, for a perfect product, careful attention on the part of the operative becomes necessary to obviate the introduction of the broken or slack warp threads and I have, therefore, combined with the instrumentalities hereinbefore described, a warp stop motion acting through a part of such instrumentalities for automatically bringing the loom to rest when the warp threads, or any of them, are in abnormal condition by slackness thereof or by breakage of one or more. In the present embodiment of my invention, I have selected for illustration a warp stop motion comprising a series of drop devices $l$, one of which is hung on each of the warp threads, as indicated in Fig. 1. Below the drop devices is a shaft $l'$ which is actuated to rock by means of a connector $l^2$ and an arm $l^3$, the end of the latter bearing upon a cam $l^4$ secured to the bottom shaft. Secured to the shaft $l'$ and rocking therewith is the feeler arm $l^5$ which, together with the arms $l^6$ and connecting rods $l^7$, may be substantially as shown and described in Patent 631,240, or the details of the warp stop motion in these respects may be varied according to circumstances of use.

Secured to one side of the feeler F, Fig. 1, is a warp stop projection $m$ and pivotally mounted on the loom frame at $m'$ is a stop lever M, the upper end of which bears against the side of the shipper handle S. Secured to the lower end of the stop lever M at $m^2$ is a forwardly extending arm $m^3$ which rests upon one end of the bell crank lever $m^4$ pivoted to a bracket $m^5$. The end of the forwardly extending arm $m^3$ is normally in the path of the warp stop projection $m$ mounted upon the feeler F, and, during the normal operation of the loom, the forwardly extending arm $m^3$ is raised by means of bell crank lever $m^4$ so as to be out of the path of the warp stop projection on the feeler F as long as the warp threads are intact. Should a warp thread break, however, or become slack, it will cause a drop device to contact with the feeler arm $l^5$ and cause the bell crank lever $m^4$ to remain at rest during the first forward beat of the feeler F, whereupon the warp stop projection $m$ will contact with the forwardly extending arm $m^3$ and stop the loom.

The construction described presents an entire automatic loom for weaving gingham or other filling figured fabric wherein a plurality of shuttle boxes of any usual type may be employed and a filling changing mechanism of desired construction is made operative to effect a change of filling on the practical exhaustion of the filling therein, and in connection with such instrumentalities, a warp stop motion being employed and connected with the stopping mechanism to bring the loom to rest on failure or abnormal condition of the warp thread, to thereby preclude the continued weaving of imperfect cloth. The loom is likewise provided with shedding mechanisms P P which may be of any usual construction well known to those skilled in the art, so that the warp threads may be properly manipulated in the formation of sheds.

It is well known to those versed in the art of shifting shuttle box weaving that the energy and brain of the operator are continually directed on the matching of the picks of color in the fabric.

In the ordinary plain single shuttle loom after the filling fork has denoted the exhaustion or break of the filling and the loom has stopped, it is only necessary for the weaver to open the proper shed and throw the shuttle through the shed or through the part of the shed where it was missing, and start the loom.

In shifting shuttle work when the filling is exhausted or broken, the filling fork, generally adjoining the single box, denotes the same and the loom is stopped within two or three picks. It has been found impossible heretofore to produce a satisfactory stop motion and brake which, working together, would stop the loom on the pick. Consequently a shuttle carrying red filling for instance, going toward the single box makes the indication, but instead of the loom stopping at once, the shuttle is returned to the shifting shuttle box side; the boxes change and a shuttle carrying blue filling for instance runs over a pick or two according to the degree of accuracy of the brake. Rather than turn the loom back with the box chain, shifting shuttle boxes, etc., the method of the weaver has been to turn back a certain number of the bars of the box chain, there being devices to accomplish this, and start the loom up again. If the operator is expert, she is able to bring this proper shuttle up into play again, refill the shuttle, fill out the length of the pick lost, and start the loom. These methods all require skill and care, and even with the most skillful and careful weavers considerable time is lost.

With the automatic gingham loom, as above described, the filling being changed automatically before the same is exhausted, it can readily be seen that the possible production of such fabrics on this loom will be far in excess of that produced on the ordinary loom where the weaver is in the habit of handling from four to six looms, whereas it is perfectly possible for a weaver of the same skill on the automatic loom to run twelve or more looms and produce more cloth per day per loom, on account of the loom being allowed to run steady without the necessity of stopping and turning back and matching the color of the pick.

Having now described my invention, what I claim and desire to secure by Letters Patent of the United States is:—

1. In an automatic loom, drop or shifting shuttle boxes at one end of the lay, having shuttles containing filling of different kinds or colors, a single shuttle box at the other end of the lay, weft replenishing mechanism, to supply different kinds or colors of filling, adjacent to the single box, and operatively connected with the drop box mechanism, and filling detector mechanism, to feel through the side of the shuttle at the single box end, and upon the substantial exhaustion of filling in the active shuttle put into operation the weft replenishing mechanism.

2. In an automatic loom having shuttles with slotted sides, containing filling carriers of different kinds or colors, drop or shifting shuttle boxes at one end of the lay, a single shuttle box at the other end of the lay, weft replenishing mechanism, to supply different kinds, or colors of filling, adjacent to the single box, and operatively connected with the drop box mechanism, a feeler, to feel and detect the condition of the filling in the active shuttle, and mounted on a stationary part of the loom at the single box end of the loom.

3. In an automatic loom having shuttles with slotted sides, containing filling carriers of different kinds or colors, drop or shifting shuttle boxes at one end of the lay, a single shuttle box at the other end of the lay, weft replenishing mechanism adjacent to the single box, and operatively connected with the drop box mechanism, a mechanical feeler also adjacent to the single box, and mounted on a stationary part of the loom, to feel and detect the condition of the filling in the active shuttle.

4. In a loom, the following instrumentalities, a lay, drop or shifting shuttle boxes, weft replenishing mechanism to supply different kinds or colors of filling, and operatively connected with the drop box mechanism, said weft replenishing mechanism put into operation by a feeler, and said feeler, to feel the condition of the filling, and detect only on the nonreplenishing pick of the loom.

5. In a loom, the following instrumentalities, a lay, drop or shifting shuttle boxes, weft replenishing mechanism, to supply different kinds or colors of filling, and operatively connected with the drop box mechanism, said weft replenishing mechanism put into operation by a feeler, and said feeler, to detect the near exhaustion of the kind or color of filling in any of the shuttles, at the forward movement of the lay, except at the beat when the weft is to be replenished.

6. In a loom, the following instrumentalities, a lay, drop or shifting shuttle boxes at one end of the lay, weft replenishing mechanism at the opposite end, operatively connected with the drop box mechanism, and a filling detector or feeler adjacent to said weft replenishing mechanism, to effect a change of filling before complete exhaustion, and means to withdraw the filling detector or feeler at the time of the replenishing operation.

7. In an automatic loom, drop or shifting shuttle boxes, weft replenishing mechanism, operatively connected with the drop box mechanism, filling detecting mechanism for operating the weft replenishing mechanism to effect a change of filling prior to the complete exhaustion of the filling in any of the shuttles, and means whereby the path of the filling on the carrier is made clear at the time of the replenishing operation.

8. In a loom, the following instrumentalities, a lay, drop or shifting shuttle boxes at one end of the same, weft replenishing mechanism at the other end, means, brought into action by the filling, to render said weft replenishing mechanism operative before the complete exhaustion of filling, devices for suspending the action of said means until the subsequent arrival of the nearly exhausted shuttle in the box adjacent to the weft replenishing mechanism, and means whereby the path of the filling carrier may be made clear in any of the shuttles during its replenishing operation.

9. In an automatic loom, drop or shifting shuttle boxes at one end of the loom, filling replenishing mechanism to supply different kinds or colors of filling, coöperating with the same, a mechanical feeler, to detect and call for the change of any kind or color of filling at the other end of the loom in any of the shuttles, before complete exhaustion, said feeler being located adjacent to the filling replenishing mechanism.

10. In an automatic loom, drop or shifting shuttle boxes at one end of the loom, filling replenishing mechanism, to supply different kinds or colors of filling, at the other end of the loom, and operatively connected with the drop box mechanism, a mechanical feeler, located on a stationary part of the loom, at the same end of the loom as the filling replenishing mechanism, to feel through the side of the shuttle, and on the substantial exhaustion of filling in the active shuttle put into operation the filling replenishing mechanism.

11. In an automatic loom, drop or shifting shuttle boxes at one end of the loom, filling replenishing mechanism to supply different kinds or colors of filling, at the other end of the loom, a mechanical feeler, located on a stationary part of the loom, at the same end of the loom as the filling replenishing mechanism, and means, brought into action by said feeler, to render said filling replenishing mechanism operative before the complete exhaustion of filling in the active shuttle.

12. In an automatic loom, drop or shifting shuttle boxes at one end of the lay, having shuttles containing filling of different kinds or colors, a single shuttle box at the other end of the lay, filling changing mechanism, to supply different kinds or colors of filling, adjacent to the single shuttle box, and mechanism to control the operation of the filling changing mechanism, and filling detecting mechanism, to feel through the side of the shuttle at the single shuttle box end of the lay.

In testimony whereof I affix my signature in presence of two witnesses.

HARRY WITTER SMITH.

Witnesses:
MINNIE G. FOLEY.
MARY M. HYLAND.

Copies of this patent may be obtained for five cents each, by addressing the "Commissioner of Patents, Washington, D. C."